US009379948B1

(12) United States Patent
Gegout et al.

(10) Patent No.: US 9,379,948 B1
(45) Date of Patent: Jun. 28, 2016

(54) SYSTEM, METHOD, AND COMPUTER PROGRAM FOR MAINTAINING QUALITY OF EXPERIENCE FOR A CLIENT DEVICE ON A NETWORK

(71) Applicant: Amdocs Software Systems Limited, Dublin (IE)

(72) Inventors: Cedric Gegout, Rennes (FR); Pierre-Erwann Gouesbet, Longaulnay (FR)

(73) Assignee: Amdocs Software Systems Limited, Dublin (IE)

( * ) Notice: Subject to any disclaimer, the term of this patent is extended or adjusted under 35 U.S.C. 154(b) by 288 days.

(21) Appl. No.: 14/014,268

(22) Filed: Aug. 29, 2013

(51) Int. Cl.
*G06F 13/00* (2006.01)
*H04L 12/24* (2006.01)

(52) U.S. Cl.
CPC ..................................... *H04L 41/50* (2013.01)

(58) Field of Classification Search
CPC ..... H04W 28/24; H04W 28/18; H04W 88/12; H04W 48/20; H04W 48/18; Y02B 60/50; H04L 41/50; H04L 41/5003; H04L 41/5009; H04L 29/06; H04L 29/08072; H04L 29/0809; H04L 29/08144; H04L 63/08
USPC ....................................................... 709/225
See application file for complete search history.

(56) References Cited

U.S. PATENT DOCUMENTS

| 5,724,346 | A  | * | 3/1998  | Kobayashi et al. ........... 370/329 |
|-----------|----|---|---------|-------------------------------------|
| 7,664,501 | B2 |   | 2/2010  | Dutta et al.                        |
| 8,280,378 | B2 | * | 10/2012 | Falchuk et al. ............... 455/436 |
| 2004/0049570 | A1 | * | 3/2004 | Frank et al. .................... 709/223 |
| 2005/0215265 | A1 | * | 9/2005 | Sharma .......................... 455/453 |
| 2006/0072502 | A1 | * | 4/2006 | Crandall et al. .............. 370/329 |
| 2006/0104231 | A1 | * | 5/2006 | Gidwani ........................ 370/328 |
| 2007/0255797 | A1 | * | 11/2007 | Dunn et al. .................... 709/217 |
| 2008/0219208 | A1 | * | 9/2008 | Adams et al. ................. 370/328 |
| 2008/0242305 | A1 | * | 10/2008 | Kahlert et al. ................ 455/440 |
| 2010/0067379 | A1 | * | 3/2010 | Zhao et al. .................... 370/235 |
| 2010/0159948 | A1 | * | 6/2010 | Spivey et al. ............. 455/456.1 |
| 2010/0178919 | A1 | * | 7/2010 | Deepak et al. ............. 455/435.2 |
| 2010/0222053 | A1 | * | 9/2010 | GiriSrinivasaRao et al. .......................... 455/432.1 |
| 2010/0278158 | A1 | * | 11/2010 | Lee et al. ...................... 370/338 |
| 2011/0228829 | A1 | * | 9/2011 | Kazarnovski et al. ........ 375/220 |
| 2011/0286344 | A1 | * | 11/2011 | Hanaoka et al. .............. 370/252 |
| 2012/0028643 | A1 | * | 2/2012 | Falchuk et al. ............... 455/436 |
| 2012/0066366 | A1 | * | 3/2012 | Blaisdell ....................... 709/223 |
| 2012/0113892 | A1 | * | 5/2012 | Luetschwager et al. ...... 370/328 |
| 2012/0269082 | A1 |   | 10/2012 | Morper et al.                        |

(Continued)

*Primary Examiner* — Robert B Harrell
(74) *Attorney, Agent, or Firm* — Zilka-Kotab, PC

(57) ABSTRACT

A system, method, and computer program product are provided for maintaining quality of experience (QoE) for a client device on a network. In use, access points that are available to a client device are determined, based on a policy. Additionally, a current QoE provided to the client device by one of the access points utilized by the client device to access the network is determined. This QoE could be valued as a score computed by a function called QoE Metric taking QoS parameters as inputs. An expected QoE associated with each of the other access points is then determined. Further, the access point utilized by the client device to access the network is conditionally switched to one of the other access points, based on the current QoE and the expected QoEs. Additionally, any potential QoE downgrades on the current access point is detected using QoE Degradation Patterns that could be matched with current QoS measures and can encourage the client device to determine more accurately the current QoE.

18 Claims, 4 Drawing Sheets

(56) References Cited

U.S. PATENT DOCUMENTS

2012/0294293 A1* 11/2012 Kahn et al. .................... 370/338
2013/0344872 A1* 12/2013 Nukala et al. ................. 455/437
2014/0105195 A1* 4/2014 Balasubarmaniyan et al. ............................ 370/338
2014/0162636 A1* 6/2014 Cui et al. ...................... 455/434

* cited by examiner

SYSTEM, METHOD, AND COMPUTER PROGRAM FOR MAINTAINING QUALITY OF EXPERIENCE FOR A CLIENT DEVICE ON A NETWORK

FIELD OF THE INVENTION

The present invention relates to the provisioning of network services provided, and more particularly to quality of service (QoS) related to the provisioning of network services.

BACKGROUND

Generally, network services are provisioned to network devices (e.g. client devices, etc.) with a required, expected, or otherwise desired QoS. Identifying the current QoS delivered by the network and the resulting Quality of Experience for the users is a difficult problem because it requires one to have measures on both the client and the network sides. Techniques used in the past to monitor and/or maintain QoS for a network service have been limited because it does not provide a collaborative approach between the network and the client sides. For example, these techniques may assume that either the QoS information is known accurately from network elements (e.g. routers, etc.), or that a network device can measure the QoS by sending/retrieving packets, which may be costly for the network operator and network device, respectively.

There is thus a need for addressing these and/or other issues associated with the prior art. For example, embodiments of the proposed invention describe a system that can optimally address this matter by mutualizing in one algorithm on the devices all the meaningful information retrieved for the client and any servers sitting in the network.

SUMMARY

A system, method, and computer program product are provided for maintaining quality of experience (QoE) for a client device on a network. In use, access points that are available to a client device are determined, based on a policy that could depend on the client device location, the user profile and any other information. Additionally, a current QoE provided to the client device by one of the access points utilized by the client device to access the network is determined. An expected QoE associated with each of the other access points is then determined. Further, the access point utilized by the client device to access the network is conditionally switched to one of the other access points, based on the current QoE and the expected QoEs.

DETAILED DESCRIPTION

Figure 1:
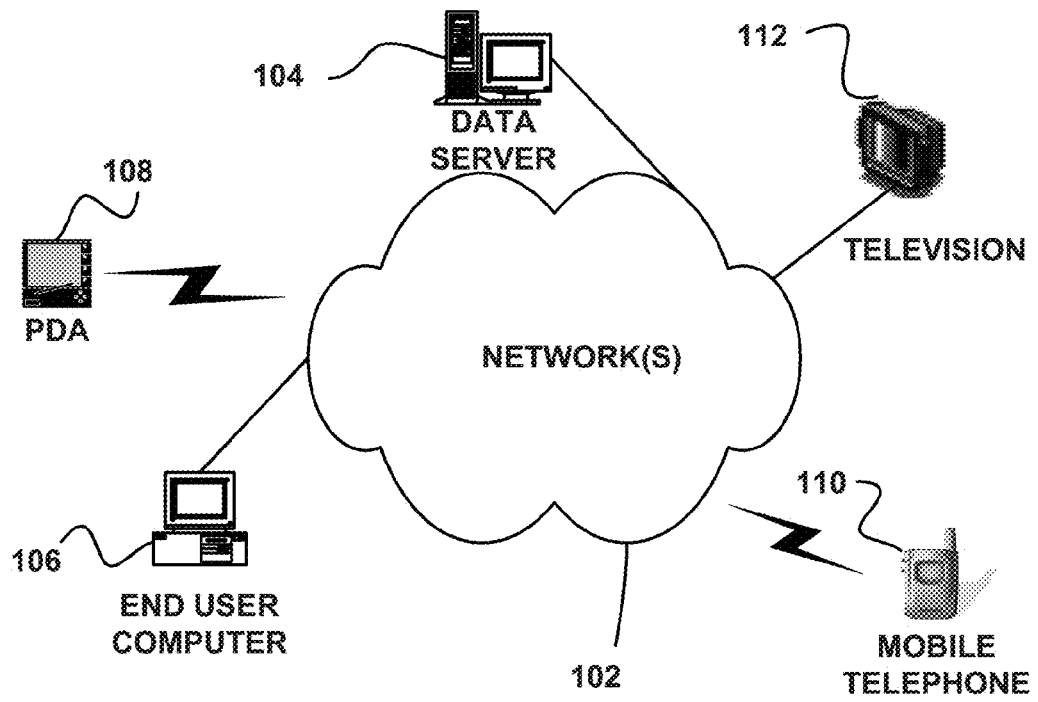
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
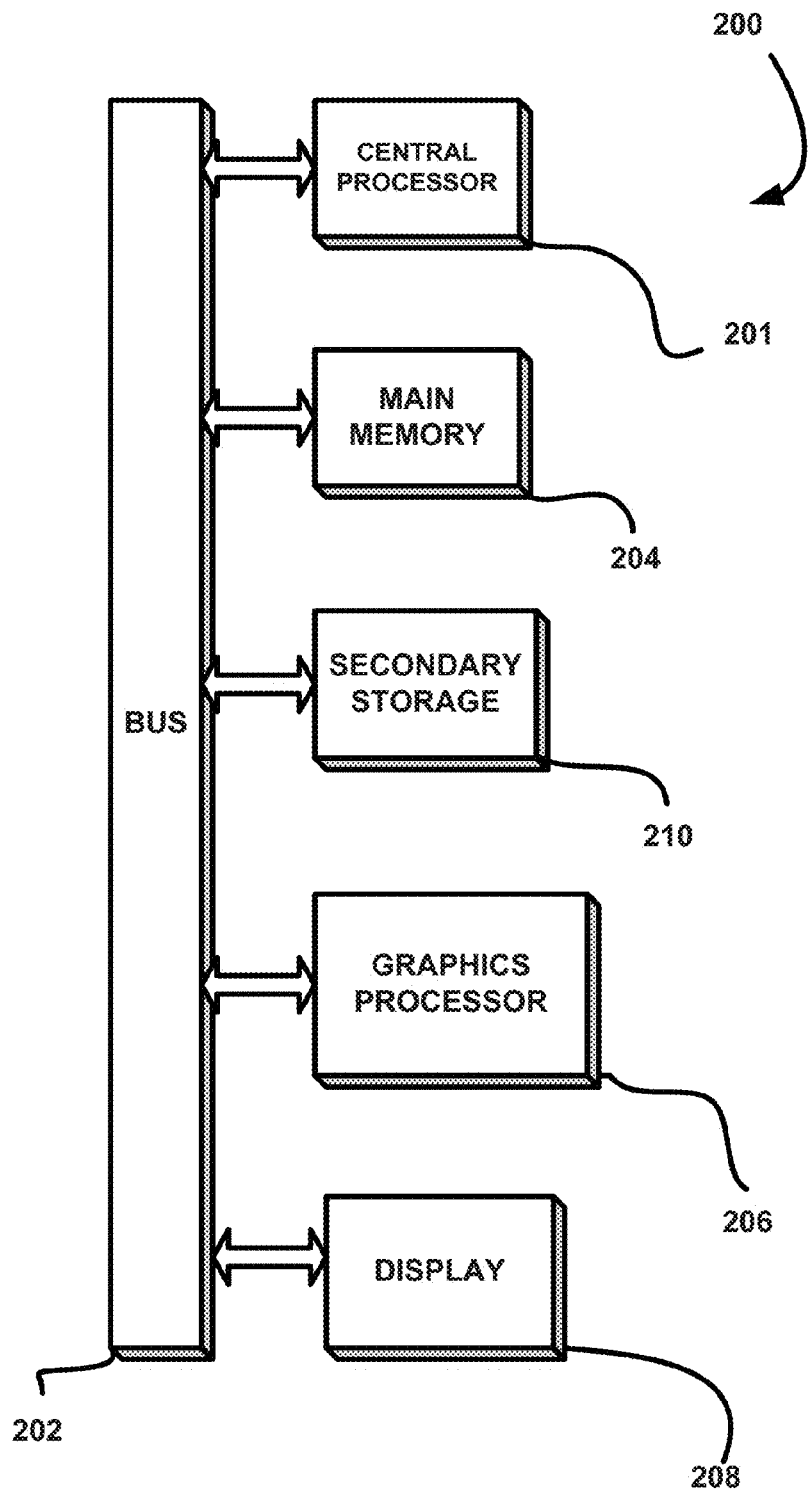
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
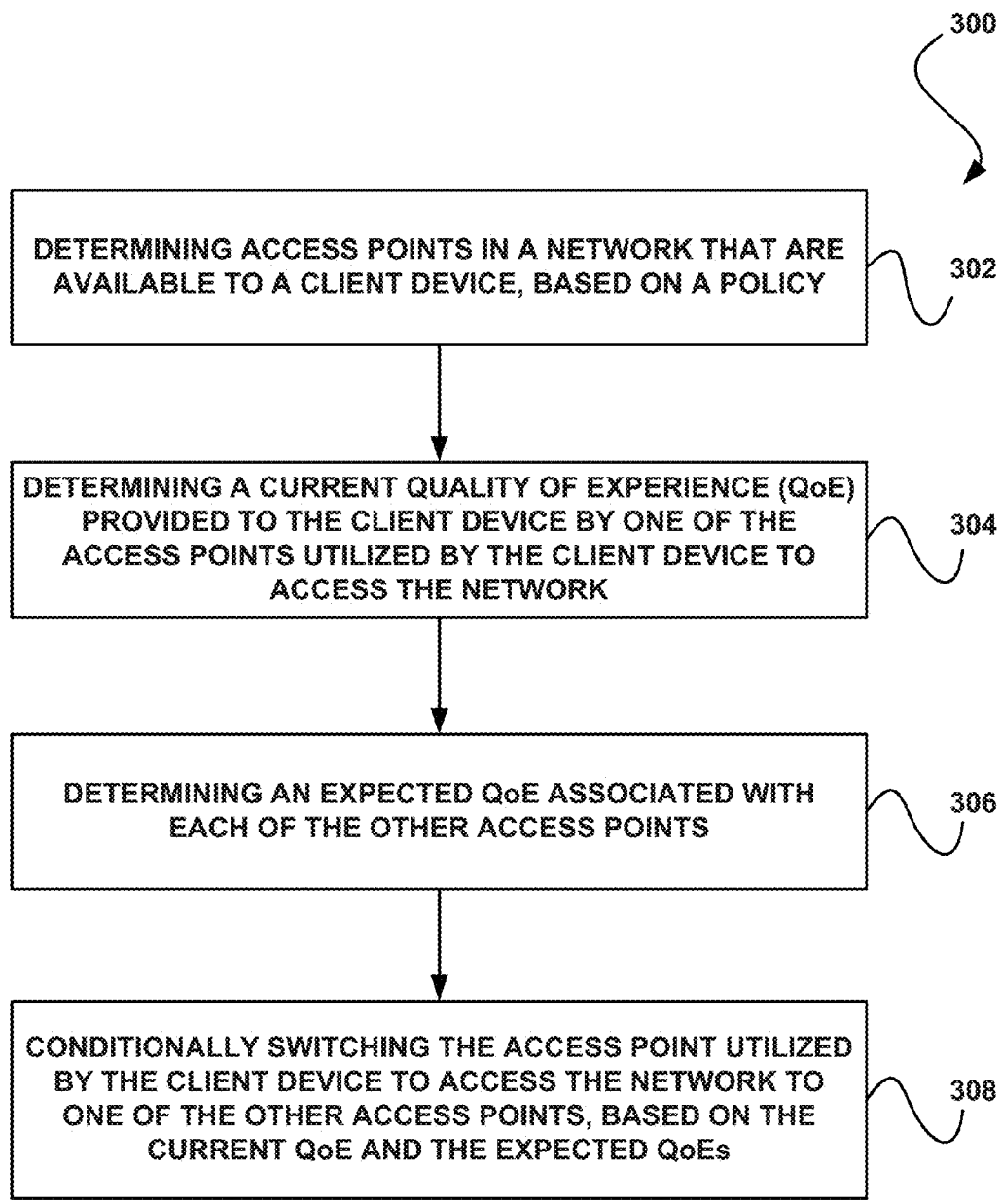
FIG. 3 illustrates a method for maintaining QoE for a client device on a network, in accordance with one embodiment.

FIG. 3 illustrates a method 300 for maintaining QoE for a client device on a network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, access points that are available to a client device are determined, based on a policy. In the context of the present description, the client device may be any device capable of being connected to a network for sending and/or receiving communications over the network. For example, the client device may be a computer, handheld (e.g. mobile) device, and/or any of the other devices described above with reference to FIG. 1.

Further, the access points may each include any point on the network to which client devices may connect for further connecting to the network. For example, the access points may include wireless access points (WAPs) located on a network or located across multiple sub-networks (e.g. cellular, Wi-Fi, femtocells, etc.) of a heterogeneous network (Het-Net). As another example, the access points may be even different (e.g. wireless) access networks within the Het-Net.

The access points may be available to the client device when the client device is capable of communicating with the access points, such as when the client device is within an accessible range of the access points. As noted above, the access points that are available to the client device may specifically determined based on a policy. The policy may be preconfigured (e.g. by the network operator, etc.), as an option. Just by way of example, the policy may be included in a configuration file, which may be provided to the client device, such that the determination of access points that are available to the client device is performed by the client device, or which may be provided to any device for use in determining which access points are available to the client device.

In one embodiment, the policy may indicate at least one trigger for determining the access points that are available to the client device. Such trigger may occur at a periodic interval, in response to an identification that a location of the client device has changed, or may be any other predefined trigger based on which the access points available to the client device are determined. To this end, the available access points may be determined only when the trigger is initiated (i.e. such that the policy indicates that the available access points should be determined).

By determining available access points based on a policy, as described above, use of resources (e.g. battery power, etc.) of the device performing the determination may be balanced with respect to the user of those resources to make the determination. As described in more detail below, the purpose for the determination may be to find access points capable of being connected to by the client device in order for a desired level of (Quality of Experience) QoE to be maintained or otherwise improved with respect to the network service consumed by the client device. Accordingly, the determination may be made at a predefined periodic interval that avoids a potential unwanted amount of delay in a situation where QoE for the client device has been reduced below a desired level. Further, as noted above, the determination may be triggered based on movement of the client device, since such movement may be a cause for QoE for the client device being reduced below a desired level.

Additionally, as shown in operation 304, a current QoE provided to the client device by one of the access points utilized by the client device to access the network is determined. In the context of the present description, the current QoE may be a subjective parameter (e.g. score, value, etc.) representing a quality of service (QoS) associated with the network as expected to be perceived by a user of the client device. Thus, the current QoE may represent the QoS of the network service as determined to be perceivable by the user. For example, QoE may be a measure of end-to-end performance at the service level from the user perspective, while QoS may be a measure of performance at the packet level from the network perspective.

In the present embodiment, the current QoE may be determined automatically (e.g. without input from the user of the client device). In a further embodiment, the current QoE may be determined from an evaluation of a predefined QoE metric, which may be an objective function (e.g. implemented by a script) that takes as input at least one QoS value measured based on operation of the client device. Such evaluation of the predefined QoE metric may be performed by the client device to determine the current QoE, as an option. As another option, the QoE metric may apply to any type of usage of the client device (e.g. video rendering, web browsing, etc.), and thus may not necessarily be specific to a particular type of usage of the client device.

An expected QoE associated with each of the other access points is then determined (note operation 306). In the context of the present description, the expected QoE for each access point may be a subjective parameter (e.g. score, value, etc.) representing a QoS associated with the network as expected to be perceived by a user of the client device when connected to the access point. Thus, the expected QoE may represent the QoS of the network service provided by each access point as would be presumed to be perceivable by the user.

In one embodiment, the expected QoE may be determined automatically (e.g. without input from the user of the client device or users of other client devices on the network). For example, the expected QoE may be determined from an evaluation of a predefined QoE metric, which may be an objective function (e.g. implemented by a script) that takes as input at least one QoS value measured based on operation of the access point. In another embodiment, a server (e.g. of a network operator) may perform the evaluation of the predefined QoE metric to determine the expected QoE for each of the other access points, and the client device may in turn determine the expected QoEs for the access points by receiving the expected QoEs from the server. For example, the server may perform the evaluation of the predefined QoE metric by collecting QoS information measured by all client devices connected to the access points and reported to the server. In an alternate embodiment, the one or more servers may provide the necessary QoS values for allowing the client device to perform the evaluation of the predefined QoE metric for each of the available access points.

Further, in operation 308, the access point utilized by the client device to access the network is conditionally switched to one of the other access points, based on the current QoE and the expected QoEs. In one embodiment, the client device may switch from the currently utilized access point to one of the available access points when the expected QoE for the one of the other access points is greater than the current QoE. In this way, the client device may switch to a selected one of the available access points for maintaining a desired level of QoE for the client device, for improving the QoE currently being experienced by the client device (via the currently used access point) to the QoE expected for the selected access point, etc.

As an option, the available access points may be ranked based on their expected QoE, and the client device may switch connection to the available access point with the best ranking, assuming that such ranking is better than the current QoE determined for the client device. In the environment where the available access points are located across sub-networks for a heterogeneous network, the aforementioned switching may include switching from one sub-network to another sub-network of the heterogeneous network. It should be noted that alternatively, where the expected QoEs for all of the other access points is not greater than the current QoE, the client device may not necessarily switch from the currently utilized access point to one of the available access points.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
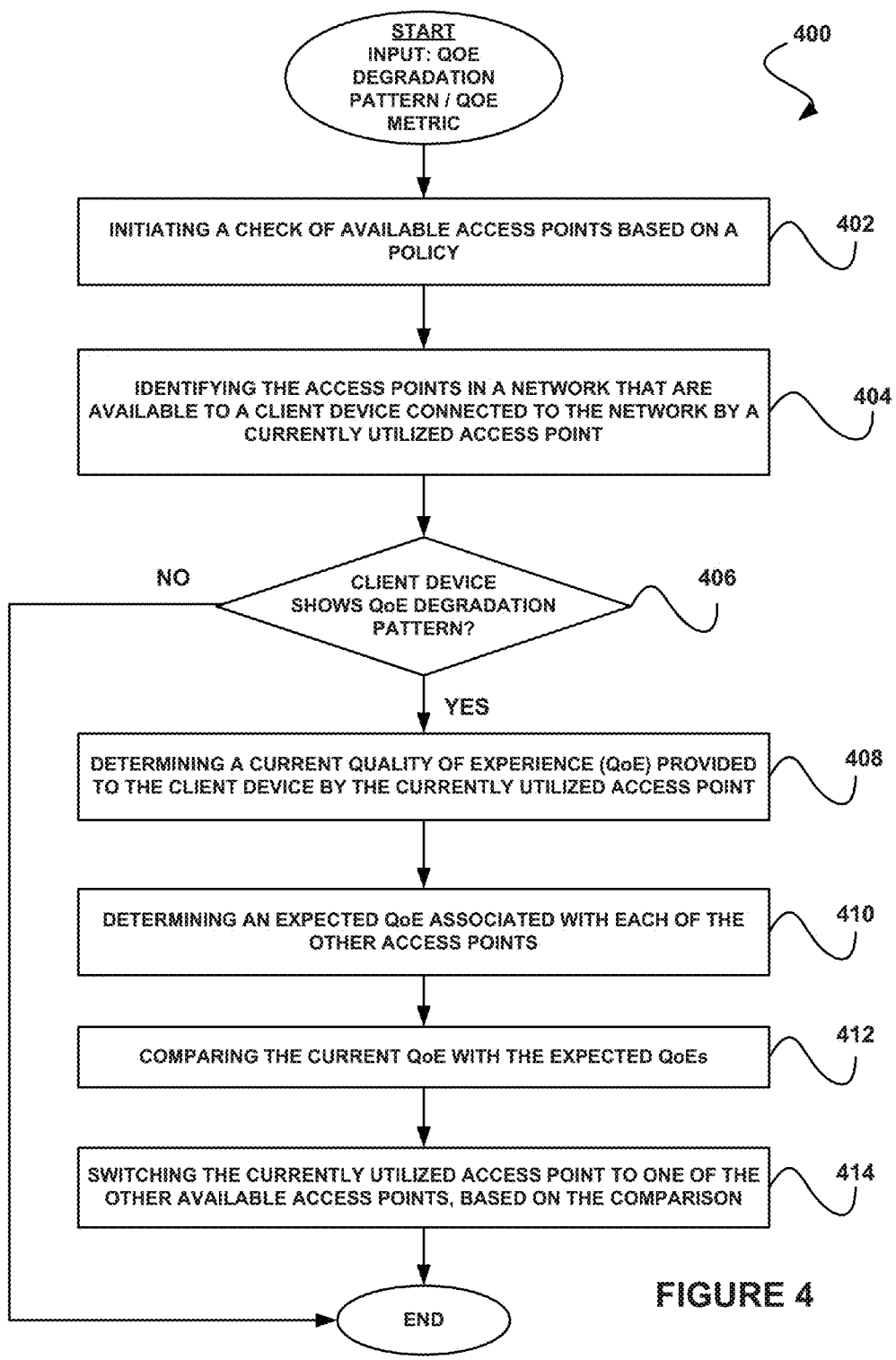
FIG. 4 illustrates a method for switching among network access points for maintaining QoE for a client device, in accordance with another embodiment.

FIG. 4 illustrates a method 400 for switching among network access points for maintaining QoE for a client device, in accordance with another embodiment. As an option, the method 400 may be carried out in the context of the details of FIGS. 1-3. For example, the method 400 may be carried out by the client device described above with reference to FIG. 3, where the client device has inputs of a QoE degradation pattern and QoE metric described below in more detail. Of course, however, the method 400 may be carried out in any desired environment. Further, the aforementioned definitions may equally apply to the description below.

As shown in operation 402, a check on available access points is initiated, based on a policy. In one embodiment, the policy may be based on battery life of the client device. Checking the available access points with a high frequency could quickly drain the battery. Checking with a low frequency may have an impact on the user experience since a bad QoE will be checked and potentially corrected with a long latency. Thus, the policy may trigger the check of available access points at a periodic interval (e.g., every 10 minutes) that is a balance between the drain on the battery and the unwanted delay in correcting an undesired QoE.

As an option, the policy may be a network checking policy that configures the client device to perform the check on the available access points according to the triggers included in the policy. The policy may be a configuration file including a script that defines how and when the check is performed. In this way, the method 400 may only proceed to operation 404 when the policy indicates that the check on available access points is to be performed.

Additionally, as shown in operation 404, where the client device is connected to the network by a currently utilized access point, the access points in the network that are available to the client device are identified. In other words, the client device may be connected to the network by one access point, and in operation 404 additional access points in the network that are available to the client device are identified. It should be noted that the available access points are any access points capable of communicating with the client device via the network, and further the available access points may be identified in any desired manner (e.g. by broadcasting a request for a response from access points in the network, and receiving the response from those that are available).

As an option, the client can be informed that some sub-networks of the heterogeneous network should be put in higher priority for cost reasons or any other reasons that are not related to QoS matters. As an example Wi-Fi networks could be put in higher priority than any cellular networks. Then the client will be able to discard the low priority networks in the ranked list to take into account only the high priority ones.

Of course, in an embodiment where there are no other available access points than the one currently utilized by the client device, the method 400 may terminate. The method 400 may then be started at operation 402 again based on the policy triggering the check.

Moreover, in decision 406 it is determined whether the client device is showing a QoE degradation pattern. In particular, it may be determined whether operation of the client device shows the QoE degradation pattern. Such QoE degradation pattern may be any predefined pattern that indicates degradation in the QoE of the client device.

Decision 406 may be determined from the expected usage of the client device and applications running on the client device (e.g. QoS for such applications). For example, the status of the link layer (i.e. IP interfaces for each app) may be checked to determine the applications running on the client device. By taking some assumptions on the most used applications, some QoE degradation patterns (and optionally heuristics) can apply to determine whether the client device is showing a QoE degradation pattern. For example, by monitoring the downlink throughput of the client device and comparing it with the downlink throughput history of the client device, the client device can identify a QoE degradation pattern when a high download has briskly decreased. Further, if the most used application is video streaming then the client device can consider that the video playback is stalled and the video decoding buffer underflows.

In one embodiment, the QoE degradation patterns (and optionally heuristics) may be included in a configuration file for the client device which further includes a script. The script may be utilized for determining whether the client device is showing one or more of the QoE degradation patterns. In this way, any QoE degradation pattern experienced by the client device may be identified utilizing the script.

Table 1 illustrates one example of the script which may be used to identify the QoE degradation patterns. Of course, it should be noted that the example in Table 1 is set forth for illustrative purposes only and should not be construed as limiting in any manner.

TABLE 1

Estimate the network activity with the ratio (IORatio) between bytes received/bytes sent by the device in a preconfigured period of time, which may be a very short time (~100 ms).
NetworkActivity is true if IORatio is higher than a pre-defined value
After a long time NetworkActivity becomes false if the IORatio goes down a pre-defined value and if the throughput is lower than another pre-defined value.
Estimate the Wireless signal-to-noise ratio (SNR) by analyzing the environment nearby in terms of hotspots.
Estimate the roundtrip delay by checking the delay between transmitted packets and received packets,
Estimate the packet drops ratio if any
If one of these estimates is lower than pre-defined values then a QoE degradation occurred.

If it is determined in decision 406 that the client device is not showing a QoE degradation pattern, the method 400 terminates. The method 400 may then be started at operation 402 again based on the policy triggering the check. If, however, it is determined in decision 406 that the client device is showing a QoE degradation pattern, a current QoE provided to the client device by the currently utilized access point is determined at the operation 408.

As described above with reference to FIG. 3, the current QoE may be determined from an evaluation of a predefined QoE metric, which may be an objective function that takes as input at least one QoS value measured based on operation of the client device. The QoE metric may be defined in a configuration file for the client device which includes a script for determining the QoS value(s) to be inputted to the objective function and further for evaluating the objective function using the determined QoS value(s). As an option, the QoE metric may apply to any type of usage of the client device (e.g. video rendering, web browsing, etc.), and thus may not necessarily be specific to a particular type of usage of the client device. However, the QoE metric may be evaluated for determining the current QoE for the particular type of usage showing the QoE degradation pattern (e.g. video streaming, etc.).

Still yet, as shown in operation 410, an expected QoE is determined for each of the available access points. As described above with reference to FIG. 3, the expected QoE for an available access point may be determined from an evaluation of a predefined QoE metric, which may be an objective function that takes as input at least one QoS value measured based on operation of the access point. One or more servers separate from the client device may perform the evaluation of the predefined QoE metric for each of the available access points, and may then provide the expected QoEs to the client device. As another option, the one or more servers may provide the necessary QoS values for allowing the client device to perform the evaluation of the predefined QoE metric for each of the available access points.

In one embodiment, a server can provision the QoS and/or QoE information of the available access points to the client device, even if the client device is actually not connected to these access points or the sub-networks accessible via the access points. This QoS and/or QoE information can be provided by routers or deep packet inspection (DPI) probes deployed on the network (e.g. Het-Net).

As shown in operation 412, the current QoE is compared with the expected QoEs. As an option, the expected QoEs may be ranked based on their respective values, such that the best QoE may be ranked highest. The current QoE may then be compared to the highest ranked QoE, to determine whether the available access point with the highest ranked QoE has a better QoE than the current QoE for the client device.

The currently utilized access point is then switched with one of the other available access points, based on the comparison (note operation 414). With reference to the example given above in operation 412, the client device may switch to the available access point with the highest ranked QoE when such highest ranked QoE is better than the current QoE for the client device. Of course, it should be noted that the currently utilized access point may be switched with one of the other available access points, based on any type of comparison with the expected QoEs.

By switching access points in the manner described above, a better connectivity experience may be provided to the user of the client device. For example, a desired level of QoE of the client device may be maintained by switching from an access point providing a lower level of QoE to an access point provided at least the desired level of QoE. As another example, QoE of the client device may be improved when a currently utilized access point begins resulting in degraded QoE for the client device.

Table 2 illustrates an example of a script that may be used to compute current and expected QoEs, and that may be used to determine whether to switch the currently utilized access point with one of the other available access points. Of course, it should be noted that the example in Table 2 is set forth for illustrative purposes only and should not be construed as limiting in any manner.

TABLE 2

1) First compute q for the current QoE as an increasing polygonal function of x = (PLRMax/packetloss), y = (PVDMax/jitter), z = (RTPMaxApp/roundtripdelay), t = (measuredbandwidth/BWminApp),
where PLRMax is a predefined maximum permissible loss ratio, and packetloss is the packet loss determined for the currently utilized access point,
where PVDMax is a predefined maximum packet variation delay, and jitter is determined for the currently utilized access point,
where RTPMaxApp is a predefined round trip delay maximum for an application, and roundtripdelay is the round trip delay determined for the currently utilized access point, and
where BWminApp is a predefined minimum bandwidth for an application, and measuredbandwidth is the measured bandwidth for the currently utilized access point.
2) If q > q_i (1 + err), where q_i are the QoE estimations of all the other networks in the device vicinity, then switch, and where err is the estimated error in percent done when computing the values above in 1).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   determining access points that are available to a client device, based on a policy;
   determining whether one or more quality of experience (QoE) degradation patterns are present at the client device, including:
      checking a status of a link layer of the client device to determine a plurality of applications running on the client device, and
      applying a configuration file containing a plurality of the QoE degradation patterns to the determined plurality of applications to determine whether one or more of the plurality of the QoE degradation patterns are present; and
   upon determining that one or more quality of experience (QoE) degradation patterns are present at the client device:
      determining a current QoE provided to the client device by one of the access points utilized by the client device to access a network;
      determining an expected QoE associated with each of the other access points; and
      conditionally switching the access point utilized by the client device to access the network to one of the other access points, based on the current QoE and the expected QoEs.

2. The computer program of claim 1, wherein the expected QoE for each access point is a subjective parameter representing a quality of service (QoS) associated with the network as expected to be perceived by a user of the client device when connected to the access point.

3. The computer program of claim 2, wherein the expected QoE is determined from an evaluation of a predefined QoE metric, and wherein the predefined QoE metric is an objective function that takes as input at least one QoS value measured based on operation of the access point.

4. The computer program of claim 3, wherein a server performs the evaluation of the predefined QoE metric to determine the expected QoE for each of the other access points, and wherein the client device determines the expected QoE for each of the other access points by receiving the expected QoEs from the server.

5. The computer program of claim 4, wherein the server performs the evaluation of the predefined QoE metric by collecting QoS information measured by all client devices connected to the access points and reported to the server.

6. The computer program of claim 1, wherein the policy indicates at least one trigger for determining the access points that are available to the client device.

7. The computer program of claim 2, wherein the at least one trigger occurs in response to identification that a location of the client device has changed.

8. The computer program of claim 6, wherein the at least one trigger occurs at a periodic interval.

9. The computer program of claim 1, wherein the current QoE is determined from an evaluation of a predefined QoE metric, and wherein the predefined QoE metric is an objective function that takes as input at least one QoS value measured based on operation of the client device.

10. The computer program of claim 9, wherein the client device performs the evaluation of the predefined QoE metric to determine the current QoE.

11. The computer program of claim 1, wherein the policy is included in a configuration file provided to the client device, such that the determination of access points that are available to the client device is performed by the client device.

12. The computer program of claim 1, wherein the configuration file includes a script.

13. The computer program of claim 1, wherein the current QoE is a subjective parameter representing a quality of service (QoS) associated with the network as expected to be perceived by a user of the client device.

14. The computer program of claim 1, wherein the access point utilized by the client device to access the network is switched to the one of the other access points when the expected QoE for the one of the other access points is greater than the current QoE.

15. The computer program of claim 1, wherein the network is a heterogeneous network, and the access points are located across sub-networks of the heterogeneous network.

16. A system, comprising:
  a hardware processor for:
    determining whether one or more quality of experience (QoE) degradation patterns are present at the client device, including:
      checking a status of a link layer of the client device to determine a plurality of applications running on the client device, and
      applying a configuration file containing a plurality of the QoE degradation patterns to the determined plurality of applications to determine whether one or more of the plurality of the QoE degradation patterns are present; and
    upon determining that one or more quality of experience (QoE) degradation patterns are present at the client device:
      determining a current QoE provided to the client device by one of the access points utilized by the client device to access a network;
      determining an expected QoE associated with each of the other access points; and
      conditionally switching the access point utilized by the client device to access the network to one of the other access points, based on the current QoE and the expected QoEs.

17. The system of claim 16, wherein the processor is coupled to memory via a bus.

18. A method, comprising:
  determining whether one or more quality of experience (QoE) degradation patterns are present at the client device, including:
    checking a status of a link layer of the client device to determine a plurality of applications running on the client device, and
    applying a configuration file containing a plurality of the QoE degradation patterns to the determined plurality of applications to determine whether one or more of the plurality of the QoE degradation patterns are present; and
  upon determining that one or more quality of experience (QoE) degradation patterns are present at the client device:
    determining a current QoE provided to the client device by one of the access points utilized by the client device to access a network;
    determining an expected QoE associated with each of the other access points; and
    conditionally switching the access point utilized by the client device to access the network to one of the other access points, based on the current QoE and the expected QoEs.

* * * * *